United States Patent
Wang (10) Patent No.: US 10,852,208 B2
(45) Date of Patent: Dec. 1, 2020

(54) QUANTIFYING GAS LEAK RATES USING FRAME IMAGES ACQUIRED BY A CAMERA

(71) Applicant: Konica Minolta Laboratory U.S.A., Inc., San Mateo, CA (US)

(72) Inventor: Leiming Wang, Foster City, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 86 days.

(21) Appl. No.: 16/099,648

(22) PCT Filed: Jun. 21, 2017

(86) PCT No.: PCT/US2017/038501
§ 371 (c)(1),
(2) Date: Nov. 7, 2018

(87) PCT Pub. No.: WO2018/044378
PCT Pub. Date: Mar. 8, 2018

(65) Prior Publication Data
US 2019/0154536 A1    May 23, 2019

Related U.S. Application Data (60) Provisional application No. 62/381,371, filed on Aug. 30, 2016.

(51) Int. Cl.
*G01M 3/04*    (2006.01)
*G01M 3/38*    (2006.01)
(Continued)

(52) U.S. Cl.
CPC .......... *G01M 3/047* (2013.01); *G01J 5/0014* (2013.01); *G01M 3/007* (2013.01); *G01M 3/38* (2013.01);
(Continued)

(58) Field of Classification Search
CPC ...... G01M 3/007; G01N 21/3504; H04N 5/33
See application file for complete search history.

(56) References Cited

U.S. PATENT DOCUMENTS

| | | | | |
|---|---|---|---|---|
| 9,599,529 | B1 * | 3/2017 | Steele | G01N 25/20 |
| 2012/0242822 | A1 * | 9/2012 | Rodney | G01V 8/10 |
| | | | | 348/81 |
| 2014/0008526 | A1 * | 1/2014 | Zeng | H04N 5/33 |
| | | | | 250/252.1 |

OTHER PUBLICATIONS

Sandsten et al. "Volume Flow Calculations on Gas Leaks Imaged With Infrared Gas-Correlation" (Year: 2012).*
(Continued)

*Primary Examiner* — Ross Varndell
(74) *Attorney, Agent, or Firm* — Osha Bergman Watanabe & Burton LLP (57) ABSTRACT

A method of quantifying gas leak rate includes receiving image frames acquired with a camera and including a plume from a gas leak source, determining a real-world size that each pixel represents, identifying pixels corresponding to the plume in a first image frame, calculating gas concentration path lengths of the plume for the pixels in the first image frame, calculating, based on the first image frame and a second image frame, an image velocity field of the plume including displacement vectors for the pixels, identifying, within the first image, a closed boundary enclosing the gas leak source of the plume, and calculating a first gas leak rate in the first image frame by calculating a volume rate of the plume flowing across the closed boundary based on the image velocity field, the gas concentration path lengths, and a time interval between the first and the second image frames.

17 Claims, 6 Drawing Sheets

(51) Int. Cl.
　　　*H04N 5/33*　　　(2006.01)
　　　*G01J 5/00*　　　(2006.01)
　　　*G01M 3/00*　　　(2006.01)
　　　*G01N 21/3504*　　(2014.01)
　　　*H04N 5/225*　　　(2006.01)

(52) U.S. Cl.
　　　CPC ........... *G01N 21/3504* (2013.01); *H04N 5/33* (2013.01); *G01J 2005/0077* (2013.01); *H04N 5/2258* (2013.01)

(56) References Cited

OTHER PUBLICATIONS

Sandsten et al., "Volume flow calculations on gas leaks imaged with infrared gas-correlation" Optics Express vol. 20 (2012) p. 20318 [retrieved Sep. 2, 2018] Retrieved from internet: <ftp://ftp.pmel.noaa.gov/vents/Buck/NWROTA_2010/bubble_plume/Sandsten%20and%20Andersson_flux.pdl> (12 pages).

Csail et al., "Modeling and Estimating Persistent Motion with Geometric Flows", 2010 IEEE Conference on Computer Vision and Pattern Recognition (8 pages).

International Search Report issued in corresponding International Application No. PCT/US2017/038501 dated Aug. 30, 2017 (2 pages).

Written Opinion of the International Searching Authority issued in corresponding International Application No. PCT/US2017/038501 dated Aug. 30, 2017 (8 pages).

International Preliminary Report on Patentability issued in corresponding International Application No. PCT/US2017/038501 dated Mar. 5, 2019 (9 pages).

\* cited by examiner

QUANTIFYING GAS LEAK RATES USING FRAME IMAGES ACQUIRED BY A CAMERA

CROSS-REFERENCE TO RELATED APPLICATIONS

This application is a national phase application of PCT Application PCT/US2017/038501, filed on Jun. 21, 2017, which claims priority to U.S. Provisional Application No. 62/381,371, filed on Aug. 30, 2016. The contents of these applications are hereby incorporated by reference in their entirety.

BACKGROUND

In recent years, Infrared (IR) optical gas imaging (OGI) cameras have been tools extensively used for gas leakage detection and monitoring due to better visualization of gas leaks, reduced inspection time and improved safety as compared to conventional gas sensing techniques, such as catalytic detectors.

In addition to the practical qualitative use of Infrared (IR) optical gas imaging (OGI) cameras, quantitative use has been suggested. For example, it is possible to quantify a concentration path length (CPL) (a concentration integrated along a path length, e.g. in unit of ppm·m) of an imaged plume with appropriate calibration.

However, due to complex flow patterns of a plume from a gas leak source and low resolution of images from a camera at a distance, the practicality of such quantitative use has been limited.

The following references may include subject matter related to the present application: U.S. Patent Application No. 2014/0008526, "Calibration and quantification method for gas imaging camera," Date of Publication: Jan. 9, 2014; and "Volume flow calculations on gas leaks imaged with infrared gas-correlation," Jonas Sandsten and Martin Andersson, (2012), Optics Express, Vol. 20, p. 20318.

SUMMARY

This summary is provided to introduce a selection of concepts that are described further in the detailed description below. This summary is not intended to identify key or essential features of the claimed subject matter, nor is it intended to be used as an aid in limiting the scope of the claimed subject matter.

In one or more embodiments of the present disclosure, a method of quantifying gas leak rate may comprise receiving a first plurality of image frames acquired with a first camera and comprising a plume from a gas leak source; identifying a plurality of pixels corresponding to the plume in a first image frame of the first plurality of images frames; calculating a plurality of gas concentration path lengths of the plume for the plurality of pixels in the first image frame; calculating, based on the first image frame and a second image frame, an image velocity field of the plume comprising a plurality of displacement vectors for the plurality of pixels; identifying, within the first image, a closed boundary enclosing the gas leak source of the plume; calculating a first gas leak rate in the first image frame by calculating a volume rate of the plume flowing across the closed boundary based on: the image velocity field; the plurality of gas concentration path lengths; and a time interval between the first image frame and the second image frame.

In one or more embodiments of the present disclosure, a non-transitory computer readable medium (CRM) may store computer readable program code embodied therein that: receives a first plurality of image frames acquired with a first camera and comprising a plume from a gas leak source; identifies a plurality of pixels corresponding to the plume in a first image frame of the first plurality of images frames; calculates a plurality of gas concentration path lengths of the plume for the plurality of pixels in the first image frame; calculates, based on the first image frame and a second image frame, an image velocity field of the plume comprising a plurality of displacement vectors for the plurality of pixels; identifies, within the first image, a closed boundary enclosing the gas leak source of the plume; calculates a first gas leak rate in the first image frame by calculating a volume rate of the plume flowing across the closed boundary based on: the image velocity field; the plurality of gas concentration path lengths; and a time interval between the first image frame and the second image frame.

In one or more embodiments of the present disclosure, a system for quantifying gas leak rate maycomprise a memory; and a processor that receives a first plurality of image frames acquired with a first camera and comprising a plume from a gas leak source; identifies a plurality of pixels corresponding to the plume in a first image frame of the first plurality of images frames; calculates a plurality of gas concentration path lengths of the plume for the plurality of pixels in the first image frame; calculates, based on the first image frame and a second image frame, an image velocity field of the plume comprising a plurality of displacement vectors for the plurality of pixels; identifies, within the first image, a closed boundary enclosing the gas leak source of the plume; calculates a first gas leak rate in the first image frame by calculating a volume rate of the plume flowing across the closed boundary based on: the image velocity field; the plurality of gas concentration path lengths; and a time interval between the first image frame and the second image frame.

Other aspects and advantages will be apparent from the following description and the appended claims.

BRIEF DESCRIPTION OF DRAWINGS

Embodiments of the invention will be described with reference to the accompanying drawings. However, the accompanying drawings illustrate only certain aspects or implementations of one or more embodiments of the invention by way of example and are not meant to limit the scope of the claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide for a method, a system, and a non-transitory computer readable medium for quantifying gas leak rate using frame images acquired by one or more cameras.

Figure 1:
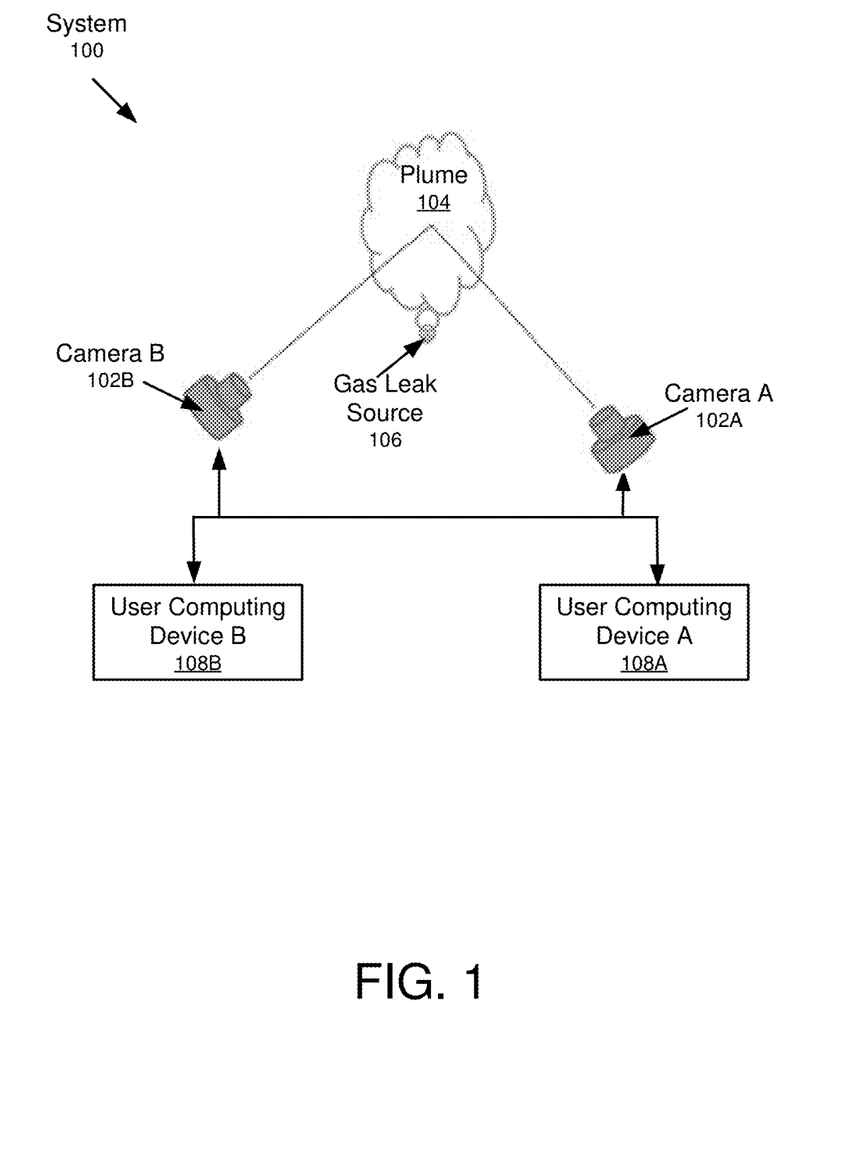
FIG. 1 shows a system for quantifying gas leak rate in accordance with one or more embodiments of the invention.

FIG. 1 shows a system (100) in accordance with one or more embodiments of the invention. As shown in FIG. 1, the system (100) includes one or more cameras (Camera A (102A), Camera B (102B)) for acquiring image frames of a scene including a plume (104) from a gas leak source (106), and one or more user computing device (User Computing Device A (108A), User Computing Device B (108B))). Each of these components is discussed below.

In one or more embodiments of the invention, the system (100) includes one or more cameras (102A, 102B). Each camera may be an infrared (IR) optical gas imaging (OGI) camera. The infrared (IR) optical gas imaging (OGI) cameras may be placed at different viewing angles with respect to the plume (104) from the gas leak source (106) and may individually acquire image frames sequentially in time. A time interval between two sequential data images may be 0.01-1 seconds, which corresponds to a frame rate of 1-100 fps (frame per second). Such image frames may each contain, for example, 320×240 pixels.

The image frames acquired by the infrared (IR) optical gas imaging (OGI) cameras (102A, 102B) may be transferred to at least one of the user computing devices (108A, 108B) for processing and storing.

In one or more embodiments of the invention, the system (100) includes one or more user computing devices (108A, 108B). Each user computing device (108A, 108B) may be a mobile computer device (e.g., smart phone, tablet computer, laptop, e-reader, etc.), a desktop personal computer (PC), a kiosk, a server, a mainframe, a cable box, etc. Each user computing device (108A, 108B) may be operated by a user and may utilize one or more graphical user interfaces (GUIs) (not shown) to generate requests to calculate a gas leak rate from the user and/or display information to the user. The user requests may specify an output location (e.g., display device, storage location, printer, etc.) for calculated data.

While FIG. 1 shows a specific configuration of components, other configurations may be used without departing from the scope of the invention. For example, various components may be combined to create a single component. As another example, the functionality performed by a single component may be performed by two or more components.

Further details of embodiments of the invention will be described below using an example of two infrared (IR) optical gas imaging (OGI) cameras (102A, 102B) and one gas leak source (106) (as shown in FIG. 1). This example is used for the purposes of illustrations only. Accordingly, the scope of the invention should not be considered limited to these specific applications.

Figure 2:
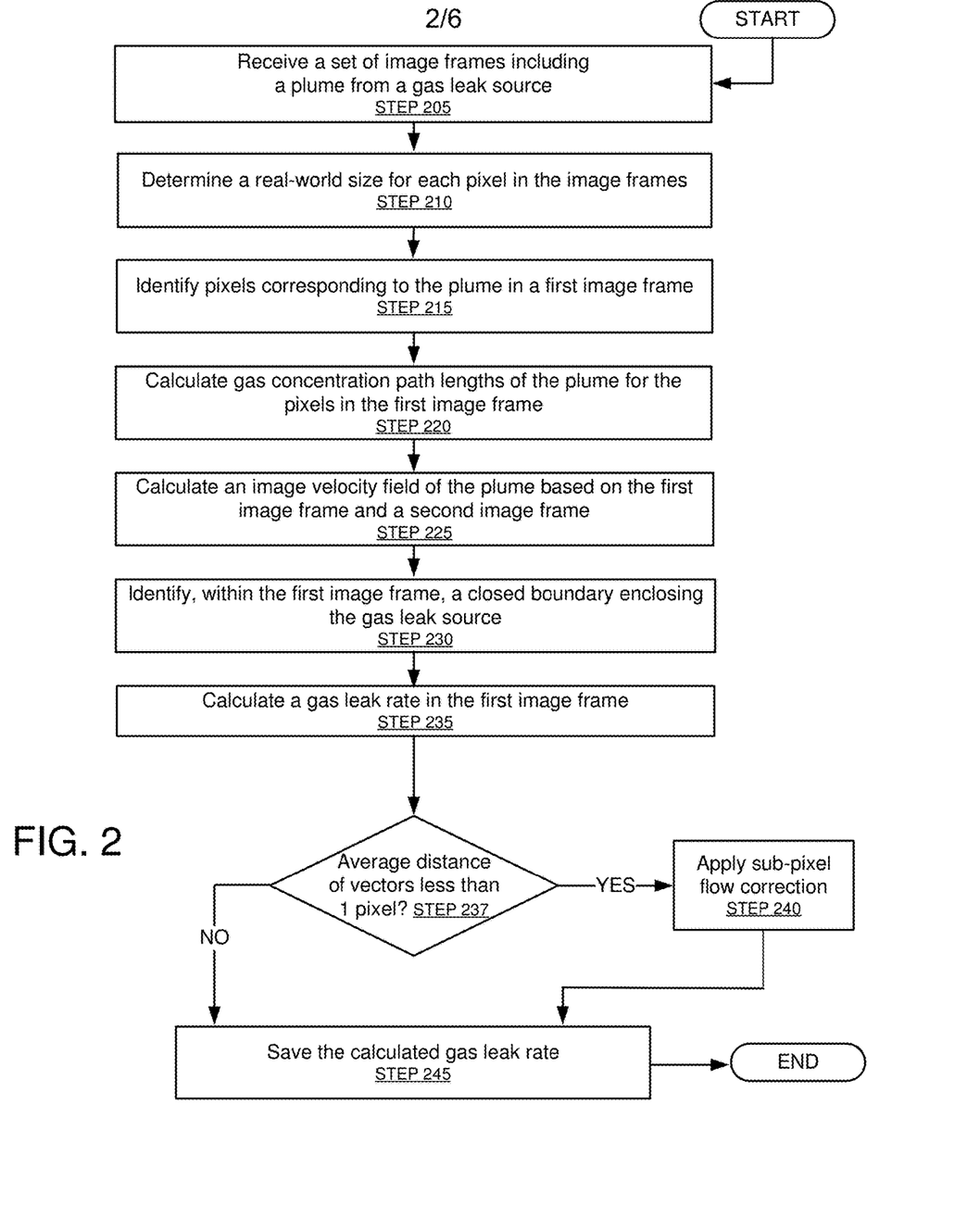
FIG. 2 is a flowchart in accordance with one or more embodiments of the invention.

FIG. 2 shows a flowchart in accordance with one or more embodiments of the invention. One or more of the steps in FIG. 2 are described below as being performed by the components of the system (100), discussed above in reference to FIG. 1. However, those skilled in the art, having the benefit of this detailed description, would appreciate that the steps may be implemented by other components without departing from the scope of the invention. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, in STEP 205, a first set of image frames may be obtained. Each of these image frames are of a scene that contains a plume (104) from a gas leak source (106). Each of these image frames may be acquired by a camera (e.g., IR OGI camera).

In STEP 210, the real-world size of each pixel in each frame image may be determined. The real-world size may be determined based on, for example, the optical magnification of the lens of the IR OGI camera, a distance between the scene and the camera, a pixel size of a sensor of the camera, etc. For example, in an image frame acquired from a distance of 100 m, each pixel may represent a real-world size of 15 cm×15 cm.

In STEP 215, the pixels in a first image frame corresponding to the plume (104) may be identified. In one or more embodiments of the invention, identifying the pixels may include receiving a selection of pixels from a user. In STEP 220, gas concentration path lengths (CPL) (in units of, e.g., ppm·m) for the identified pixels in the first image frame may be calculated by a known calibration method, such as the method described in U.S. Patent Application No. 2014/0008526.

As used herein, the gas concentration path length (CPL) is a concentration of the plume integrated along a path distance that IR light travels through the gas plume (that is, the "thickness" of the gas plume).

In STEP 225, an image velocity field of the plume may be calculated based on the first image frame and the second image of the first set of image frames. The image velocity field may include a displacement vector with a distance component and a direction component for each of the pixels identified in STEP 215. The image velocity field shows the movement of a pixel from the first image frame to the second image frame during the time interval between the first image frame and the second image frame.

The image velocity field may be calculated using an optical flow method. Additionally or alternatively, the image velocity field may be calculate using a geometric flow method. Other techniques may also be used to calculate the image velocity field. In one or more embodiments, vectors may be calculated only for the identified pixels (as opposed to all pixels in the frame image) to reduce computational time.

For image frames in poor quality, for example, with low contrast and/or low signal-to-noise ratio, the image frames may be post-processed prior to calculating of the image velocity field. Each post-processed image frame may be a concentration path length (CPL) map image, which is a map of the calibrated CPL values at pixels of a raw image frame onto a uniform background using grey scale or false color. Arrows representing the obtained image velocity field may be superimposed onto the image for visualization.

In STEP 230, the gas leak source may be identified in the first image frame and a closed boundary enclosing the gas leak source in the first image frame may be established. In one or more embodiments, identifying the gas leak source may include receiving, from a user, a selection of pixels corresponding to the gas leak source. In one or more embodiments, establishing the closed boundary includes receiving, from a user, a selection of pixels tracing the closed boundary. The closed boundary may enclose an area of the plume that is visually apparent in the image frame. For example, the boundary may enclose an area of the plume where the plume is not too thin and not too thick (i.e., where the gas CPL is in a medium-range), in order to reduce errors resulting from the CPL calibration. Using a closed boundary enclosing the gas leak source to determine gas leak rate may eliminate the need to track the gas flow directions as commonly found in prior arts (e.g., U.S. Patent Application No. 2014/0008526) and may reduce the influence of wind. The closed boundary may be any shape or size.

Figure 3:
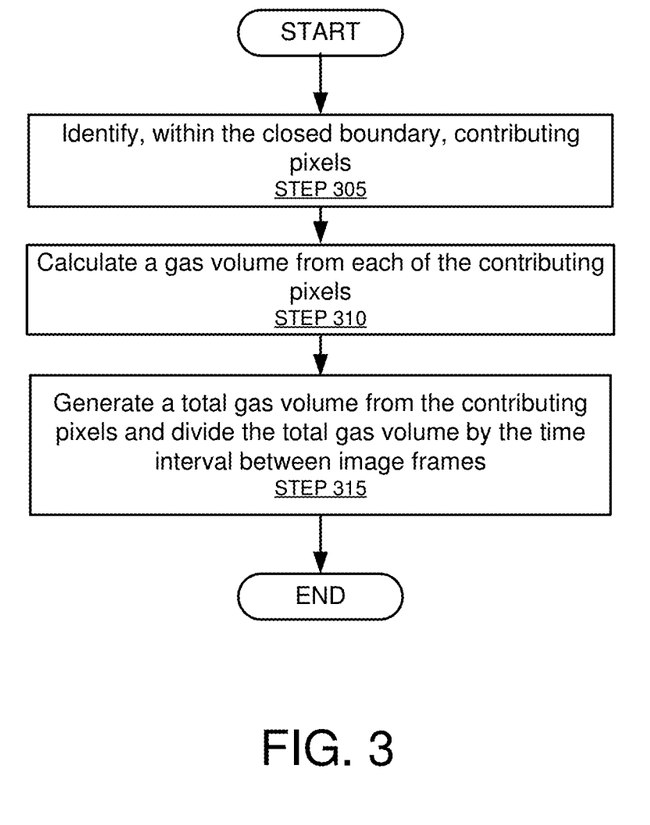
FIG. 3 is a flowchart in accordance with one or more embodiments of the invention.

In STEP 235, a first gas leak rate in the first image frame may be calculated. As used herein, the gas leak rate is a volume rate of the plume (104) flowing across the closed boundary from inside to outside the closed boundary (in units of, e.g., $m^3/s$). The first gas leak rate may be calculated using one or more of the real-world size of each pixel, the image velocity field of the plume, the gas concentration path length of the plume at each pixel of the first image frame, and the time interval between the first image frame and the second image frame. One example for implementing STEP 235 is shown in FIG. 3.

In STEP 237, it may be determined whether the average distance of the displacement vectors in the image velocity field of the contributing pixels is less than 1 pixel. As used herein, a contributing pixel is defined as a pixel that has a displacement vector, from the image velocity field, pointing from the contributing pixel to outside the closed boundary. When it is determined that the average distance is less than 1 pixel, the process proceeds to STEP 240, and a sub-pixel flow correction method may be applied.

The sub-pixel flow correction method in STEP 240 may comprise multiplying (scaling) the calculated first gas leak rate by a factor of the average distance of the displacement vectors of contributing pixels as obtained in STEP 237. This scaling may provide an automated correction for the overestimation of the gas leak rate caused by digital counting of contributing pixels (i.e., a pixel is the smallest unit in the image, and it is identified as either a contributing or a non-contributing pixel, while the actual contribution of a contributing pixel may be less than 1).

An additional or alternative sub-pixel flow correction method may comprise calculating the gas leak rate in the first image frame using the first image frame and a third image frame subsequent to the second image frame. In other words, the gas leak rate may be calculated using two image frames that are not consecutive. This may correspond to reducing the frame rate of the infrared optical gas imaging camera.

Further, in STEP 245, the calculated gas leak rate may be saved in a memory, and STEPs 215 to 240 may be repeated to calculate a gas leak rate in another image frame, until a gas leak rate for each image frame in the first plurality of image frames is calculated. The gas leak rates may be averaged (e.g., weighted average).

In one or more embodiments, a second set of image frames may be acquired by a different camera having a different viewing angle. In one or more embodiments, the viewing angle of a first camera is orthogonal to the viewing angle of a second camera. This second set of image frames also capture the plume. An average gas leak rate may be determined based on this second set of image frames using the process described in FIG. 2. Moreover, the averaged gas leak rate from the first set and the averaged gas leak rate from the second set may be combined (e.g., weighted average).

In one or more embodiments, a three-dimensional (3D) shape of the gas plume may be estimated based on the images obtained from orthogonal viewing angles of a plurality of cameras using various mathematical techniques. In one or more embodiments, the 3D estimated shape of the gas plume may be calculated using a distributed computational system.

FIG. 3 shows a flowchart in accordance with one or more embodiments of the invention. One or more of the steps in FIG. 3 are described below as being performed by the components of the system (100), discussed above in reference to FIG. 1. However, those skilled in the art, having the benefit of this detailed description, would appreciate that the steps may be implemented by other components without departing from the scope of the invention. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

In STEP 305, contributing pixels inside the closed boundary may be identified. As described above, a pixel inside or on the closed boundary may be identified as a contributing pixel if the pixel, when its displacement vector from the image velocity field is added to it, moves across the closed boundary to outside the closed boundary.

In STEP 310, a gas volume (in units of, e.g., $m^3$) from each contributing pixel may be calculated by multiplying the CPL value (in units of, e.g., ppm·m) at the pixel by the real-world size (in units of, e.g., $m^2$) of the pixel. The gas volume may be scaled by a factor of $10^{-6}$ to remove ppm (parts per million, i.e., $10^{-6}$) in the unit.

In STEP 315, the gas leak rate may be calculated by summing the individual gas volumes from the contributing pixels, and then dividing this total gas volume by the time interval between the first image frame and the second image frame.

Figure 4:
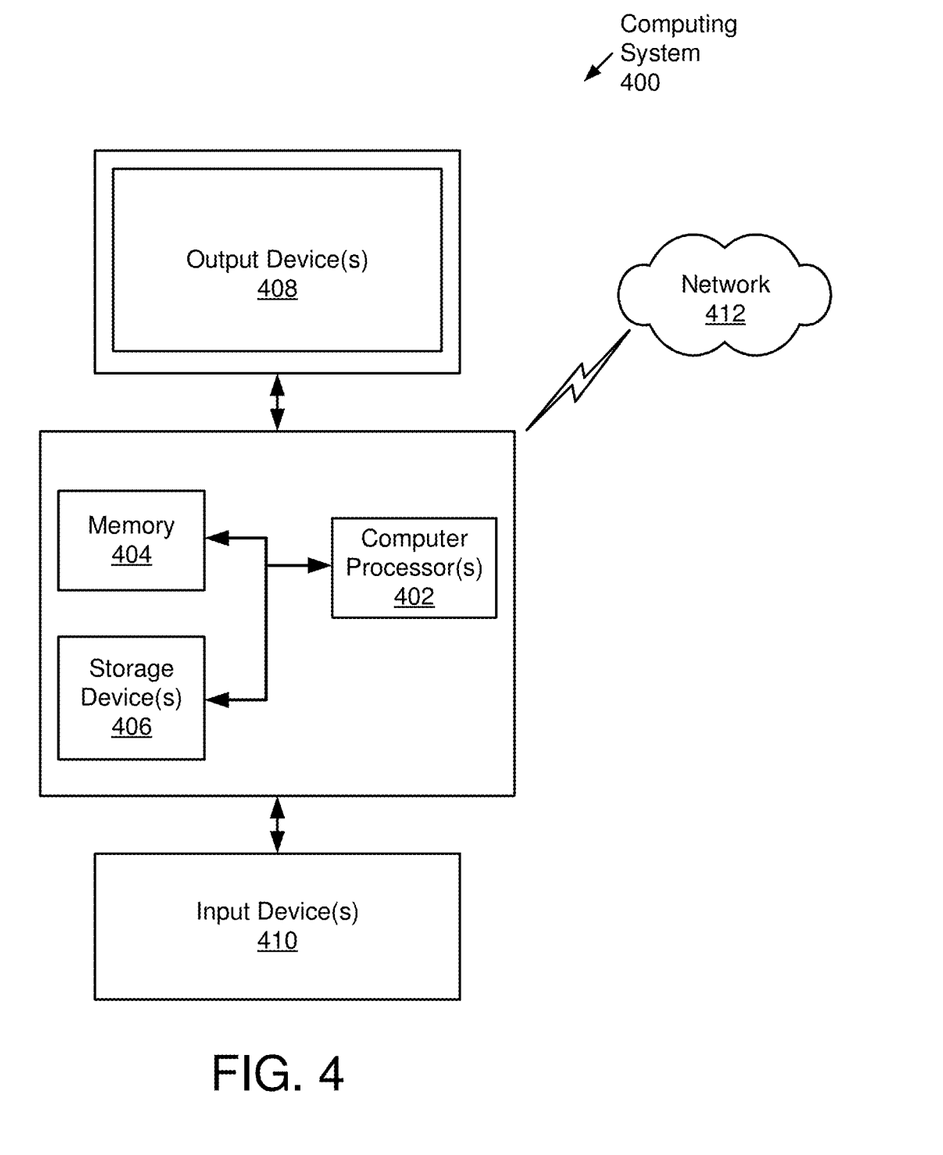
FIG. 4 shows a computer system in accordance with one or more embodiments of the invention.

Embodiments of the invention may be implemented on virtually any type of computing system, regardless of the platform being used. For example, the user computing devices may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The processor(s) (402) may be an integrated circuit for processing instructions. For example, the processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), performs one or more embodiments of the invention.

Further, one or more elements of the aforementioned computing system (400) may be located at a remote location and connected to the other elements over a network (412). Further, one or more embodiments of the invention may be implemented on a distributed system having a plurality of nodes, where each portion of the invention may be located on a different node within the distributed system. In one or more embodiments of the invention, the node corresponds to a distinct computing device. Alternatively, the node may correspond to a processor with associated physical memory. The node may alternatively correspond to a processor or micro-core of a processor with shared memory and/or resources.

By using a closed boundary enclosing the gas leak source to determine gas leak rate, and applying an automated sub-pixel flow correction method, one or more embodiment of the invention may enable gas leak rate quantification for IR OGI with improved practicality and accuracy.

Figure 5A:
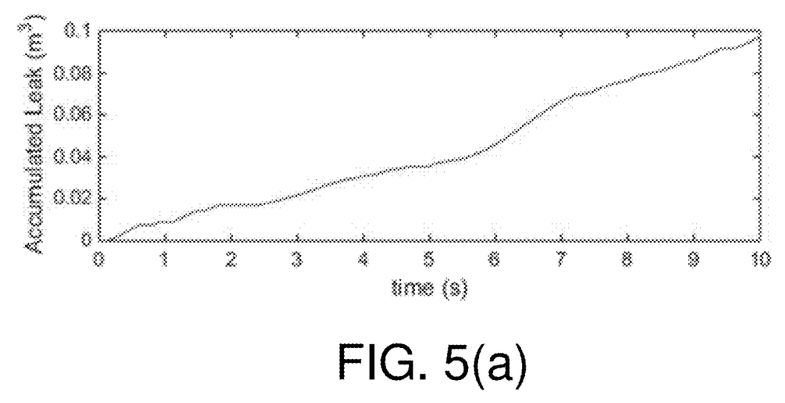
FIGS. 5(A) and 5(B) illustrate values for a gas volume of a plume from a gas leak source over the contributing pixels in image frames taken at frame rates 10 fps and 30 fps, respectively, without application of the sub-pixel flow correction method.
Figure 5B:
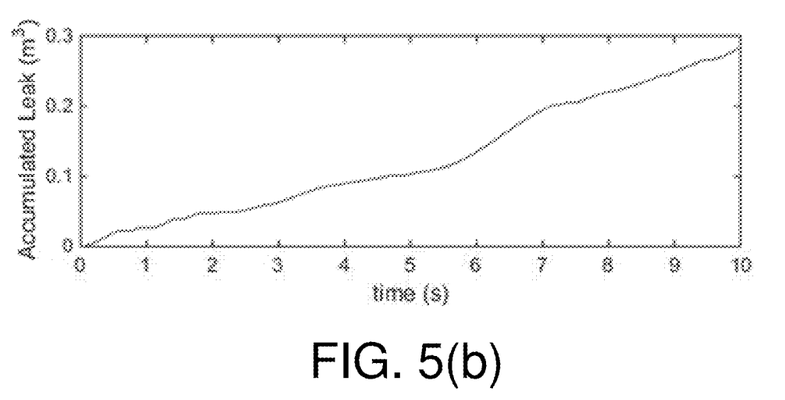

FIGS. 5(A) and 5(B) illustrate values for a gas volume of a plume from a gas leak source as a function of time obtained from image frames taken at frame rates of 10 fps and 30 fps, respectively, without application of the sub-pixel flow correction method. FIGS. 5(A) and 5(B) show inconsistency in the values for the gas volume of the same plume between the two different frame rates, indicating low accuracy.

Figure 6A:
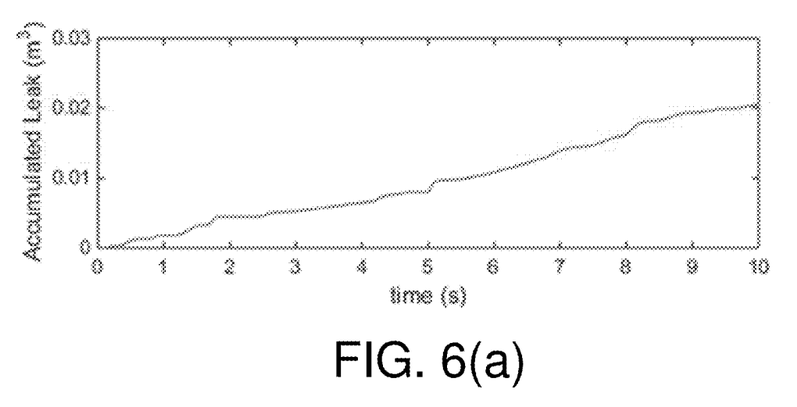
FIGS. 6(A) and 6(B) illustrate values shown in FIGS. 5(A) and 5(B), respectively, after application of the sub-pixel flow correction method.
Figure 6B:
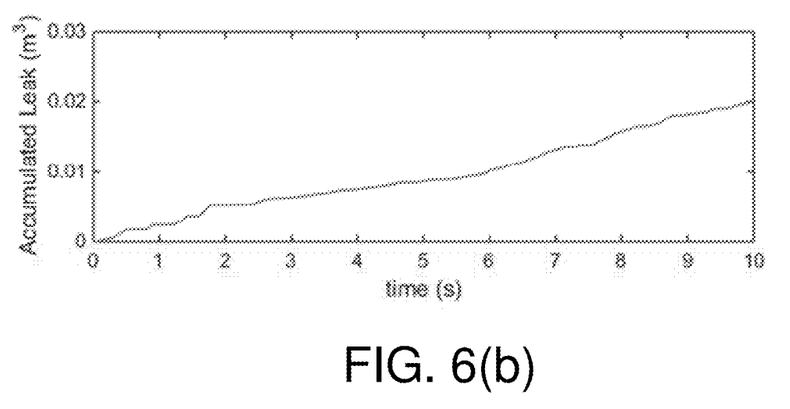

FIGS. 6(A) and 6(B) illustrate values shown in FIGS. 5(A) and 5(B), respectively, after application of the sub-pixel flow correction method. FIGS. 6(A) and 6(B) show consistency in the value for the gas volume of the same plume between the two different frame rates, indicating improved accuracy.

While the invention has been described with respect to a limited number of embodiments, those skilled in the art, having benefit of this disclosure, will appreciate that other embodiments can be devised without departing from the scope of the invention as disclosed herein. Accordingly, the scope of the invention should be limited only by the attached claims.

What is claimed is:

1. A method of quantifying gas leak rate, comprising:
   receiving a first plurality of image frames acquired with a first camera and comprising a plume from a gas leak source;
   identifying a plurality of pixels corresponding to the plume in a first image frame of the first plurality of images frames;
   calculating a plurality of gas concentration path lengths of the plume for the plurality of pixels in the first image frame;
   calculating, based on the first image frame and a second image frame, an image velocity field of the plume comprising a plurality of displacement vectors for the plurality of pixels;
   identifying, within the first image, a plurality of pixels corresponding to the gas leak source and generating a closed boundary enclosing an entirety of the plurality of pixels corresponding to the gas leak source;
   calculating a first gas leak rate in the first image frame by calculating a volume rate of the plume flowing across the closed boundary based on:
   the image velocity field;
   the plurality of gas concentration path lengths; and
   a time interval between the first image frame and the second image frame,
   wherein the method further comprises:
   post-processing the first plurality of image frames prior to calculating of the image velocity field of the plume;
   calculating the gas leak rate using the first gas leak rate, and
   wherein the first plurality of post-processed image frames are concentration path length map images.

2. The method of claim 1, further comprising:
   calculating an average distance of the plurality of displacement vectors;
   applying a sub-pixel flow correction method in response to the average distance being less than 1 pixel.

3. The method of claim 2, wherein the sub-pixel flow correction method comprises:
   scaling the calculated first gas leak rate by a factor of the average distance of the image velocity field at each of the plurality of pixels.

4. The method of claim 1, further comprising:
   calculating a second gas leak rate in the second image frame; and
   calculating an average gas leak rate based on the first gas leak rate and the second gas leak rate.

5. The method of claim 1, wherein calculating the volume rate comprises:
   identifying, within the closed boundary, a first contributing pixel comprising a displacement vector that points from the first contributing pixel to outside the closed boundary;
   identifying, within the closed boundary, a second contributing pixel comprising a second displacement vector that points from the second contributing pixel to outside the closed boundary;
   calculating a first gas volume from the first contributing pixel by multiplying the concentration path length of the first contributing pixel by the real-world size of the first contributing pixel;
   calculating a second gas volume from the second contributing pixel by multiplying the concentration path length of the second contributing pixel by the real-world size of the second contributing pixel; and
   generating a total gas volume by summing the first gas volume and the second gas volume; and
   dividing the total gas volume by the time interval between the first image frame and the second image frame.

6. The method of claim 1, wherein the image velocity field of the plume is calculated by an optical flow method.

7. The method of claim 1, wherein the image velocity field of the plume is calculated by a geometric flow method.

8. The method of claim 1, further comprising:
obtaining a second plurality of image frames acquired by a second camera and comprising the plume from the gas leak source,
wherein the first camera and the second camera are at different viewing angles;
calculating a second gas leak rate using the second plurality of image frames; and
averaging the first gas leak rate and the second gas leak rate.

9. The method of claim 8, wherein the viewing angle of the first camera is orthogonal to the viewing angle of the second camera.

10. A non-transitory computer readable medium (CRM) storing computer readable program code embodied therein that:
receives a first plurality of image frames acquired with a first camera and comprising a plume from a gas leak source;
identifies a plurality of pixels corresponding to the plume in a first image frame of the first plurality of images frames;
calculates a plurality of gas concentration path lengths of the plume for the plurality of pixels in the first image frame;
calculates, based on the first image frame and a second image frame, an image velocity field of the plume comprising a plurality of displacement vectors for the plurality of pixels;
identifies, within the first image, a plurality of pixels corresponding to the gas leak source and generating a closed boundary enclosing an entirety of the plurality of pixels corresponding to the gas leak source;
calculates a first gas leak rate in the first image frame by calculating a volume rate of the plume flowing across the closed boundary based on:
the image velocity field;
the plurality of gas concentration path lengths; and
a time interval between the first image frame and the second image frame;
post-processes the first plurality of image frames prior to calculating of the image velocity field of the plume;
calculates the gas leak rate using the first gas leak rate, and
wherein the first plurality of post-processed image frames are concentration path length map images.

11. The non-transitory computer readable medium (CRM) of claim 10 storing computer readable program code embodied therein that further:
calculates an average distance of the plurality of displacement vectors;
applies a sub-pixel flow correction method in response to the average distance being less than 1 pixel.

12. The non-transitory computer readable medium (CRM) of claim 10 storing computer readable program code embodied therein that further:
calculates a second gas leak rate in the second image frame; and
calculates an average gas leak rate based on the first gas leak rate and the second gas leak rate.

13. The non-transitory computer readable medium (CRM) of claim 10 storing computer readable program code embodied therein, wherein calculating the volume rate comprises:
identifying, within the closed boundary, a first contributing pixel comprising a displacement vector that points from the first contributing pixel to outside the closed boundary;
identifying, within the closed boundary, a second contributing pixel comprising a second displacement vector that points from the second contributing pixel to outside the closed boundary;
calculating a first gas volume from the first contributing pixel by multiplying the concentration path length of the first contributing pixel by the real-world size of the first contributing pixel;
calculating a second gas volume from the second contributing pixel by multiplying the concentration path length of the second contributing pixel by the real-world size of the second contributing pixel; and
generating a total gas volume by summing the first gas volume and the second gas volume; and
dividing the total gas volume by the time interval between the first image frame and the second image frame.

14. A system for quantifying gas leak rate, comprising:
a memory; and
a processor that:
receives a first plurality of image frames acquired with a first camera and comprising a plume from a gas leak source;
identifies a plurality of pixels corresponding to the plume in a first image frame of the first plurality of images frames;
calculates a plurality of gas concentration path lengths of the plume for the plurality of pixels in the first image frame;
calculates, based on the first image frame and a second image frame, an image velocity field of the plume comprising a plurality of displacement vectors for the plurality of pixels;
identifies, within the first image, a plurality of pixels corresponding to the gas leak source and generating a closed boundary enclosing an entirety of the plurality of pixels corresponding to the gas leak source;
calculates a first gas leak rate in the first image frame by calculating a volume rate of the plume flowing across the closed boundary based on:
the image velocity field;
the plurality of gas concentration path lengths; and
a time interval between the first image frame and the second image frame,
wherein the processor further:
post-processes the first plurality of image frames prior to calculating of the image velocity field of the plume;
calculates the gas leak rate using the first gas leak rate, and
wherein the first plurality of post-processed image frames are concentration path length map images.

15. The system of claim 14, wherein the processor further:
calculates an average distance of the plurality of displacement vectors;
applies a sub-pixel flow correction method in response to the average distance being less than 1 pixel.

16. The system of claim 14, wherein the processor further:
calculates a second gas leak rate in the second image frame; and
calculates an average gas leak rate based on the first gas leak rate and the second gas leak rate.

17. The system of claim 14, wherein calculating the volume rate comprises:
identifying, within the closed boundary, a first contributing pixel comprising a displacement vector that points from the first contributing pixel to outside the closed boundary;

identifying, within the closed boundary, a second contributing pixel comprising a second displacement vector that points from the second contributing pixel to outside the closed boundary;

calculating a first gas volume from the first contributing pixel by multiplying the concentration path length of the first contributing pixel by the real-world size of the first contributing pixel;

calculating a second gas volume from the second contributing pixel by multiplying the concentration path length of the second contributing pixel by the real-world size of the second contributing pixel; and generating a total gas volume by summing the first gas volume and the second gas volume; and dividing the total gas volume by the time interval between the first image frame and the second image frame.

\* \* \* \* \*